United States Patent
Stowe et al.

(10) Patent No.: US 9,638,809 B2
(45) Date of Patent: May 2, 2017

(54) HANDHELD DUAL THERMAL NEUTRON DETECTOR AND GAMMA-RAY SPECTROMETER

(71) Applicants: Ashley C. Stowe, Knoxville, TN (US); Arnold Burger, Nashville, TN (US); Pijush Bhattacharya, Nashville, TN (US); Yevgeniy Tupitsyn, Nashville, TN (US)

(72) Inventors: Ashley C. Stowe, Knoxville, TN (US); Arnold Burger, Nashville, TN (US); Pijush Bhattacharya, Nashville, TN (US); Yevgeniy Tupitsyn, Nashville, TN (US)

(73) Assignees: Consolidated Nuclear Security, LLC, Oak Ridge, TN (US); Fisk University, Nashville, TN (US)

( * ) Notice: Subject to any disclaimer, the term of this patent is extended or adjusted under 35 U.S.C. 154(b) by 162 days.

(21) Appl. No.: 14/453,768

(22) Filed: Aug. 7, 2014

(65) Prior Publication Data
US 2016/0041273 A1 Feb. 11, 2016
US 2017/0090045 A9 Mar. 30, 2017

Related U.S. Application Data

(63) Continuation-in-part of application No. 13/658,591, filed on Oct. 23, 2012, now Pat. No. 9,334,581.

(51) Int. Cl.
*G01T 1/20* (2006.01)
*G01T 1/202* (2006.01)
(Continued)

(52) U.S. Cl.
CPC ............ *G01T 1/2023* (2013.01); *G01T 1/202* (2013.01); *G01T 1/208* (2013.01); *G01T 3/06* (2013.01)

(58) Field of Classification Search
CPC .................................................... G01T 1/2023
See application file for complete search history.

(56) References Cited

U.S. PATENT DOCUMENTS 5,393,981 A 2/1995 Szabo et al.
6,373,066 B1 * 4/2002 Penn ........................ G01T 3/06
250/363.02

(Continued)

*Primary Examiner* — Edwin Gunberg
(74) *Attorney, Agent, or Firm* — Clements Bernard Walker PLLC; Christopher L. Bernard; Lawrence A. Baratta, Jr.

(57) ABSTRACT

A combined thermal neutron detector and gamma-ray spectrometer system, including: a first detection medium including a lithium chalcopyrite crystal operable for detecting neutrons; a gamma ray shielding material disposed adjacent to the first detection medium; a second detection medium including one of a doped metal halide, an elpasolite, and a high Z semiconductor scintillator crystal operable for detecting gamma rays; a neutron shielding material disposed adjacent to the second detection medium; and a photodetector coupled to the second detection medium also operable for detecting the gamma rays; wherein the first detection medium and the second detection medium do not overlap in an orthogonal plane to a radiation flux. Optionally, the first detection medium includes a $^6$LiInSe$_2$ crystal. Optionally, the second detection medium includes a SrI$_2$(Eu) scintillation crystal.

18 Claims, 4 Drawing Sheets

(51) Int. Cl.
　　　*G01T 1/208*　　　(2006.01)
　　　*G01T 3/06*　　　(2006.01)

(56) References Cited

U.S. PATENT DOCUMENTS

| | | | |
|---|---|---|---|
| 7,335,891 B2 | 2/2008 | Kniss et al. | |
| 8,580,149 B2* | 11/2013 | Payne | C09K 11/7733 252/301.4 H |
| 9,013,102 B1* | 4/2015 | Wedding | H01J 47/12 250/374 |
| 2005/0023479 A1 | 2/2005 | Grodzins | |
| 2007/0080301 A1* | 4/2007 | Bell | G01T 1/24 250/370.12 |
| 2012/0197529 A1* | 8/2012 | Stephenson | G01V 5/101 702/8 |
| 2012/0241630 A1 | 9/2012 | Walker et al. | |

* cited by examiner

HANDHELD DUAL THERMAL NEUTRON DETECTOR AND GAMMA-RAY SPECTROMETER

CROSS-REFERENCE TO RELATED APPLICATION

The present patent application/patent is a continuation-in-part (CIP) of co-pending U.S. patent application Ser. No. 13/658,591, filed on Oct. 23, 2012, and entitled "METHODS FOR SYNTHESIZING SEMICONDUCTOR QUALITY CHALCOPYRITE CRYSTALS FOR NONLINEAR OPTICAL AND RADIATION DETECTION APPLICATIONS AND THE LIKE," the contents of which are incorporated in full by reference herein.

STATEMENT REGARDING FEDERALLY SPONSORED RESEARCH OR DEVELOPMENT

The U.S. Government has rights to the present disclosure pursuant to Contract No. AC05-00OR22800 between the U.S. Department of Energy and Babcock and Wilcox Technical Services Y-12, LLC.

FIELD OF THE DISCLOSURE

The present disclosure relates generally to methods for synthesizing semiconductor quality chalcopyrite crystals for nonlinear optical and radiation detection applications and the like. More specifically, the present disclosure relates to methods for synthesizing a semiconductor detector of ionizing electromagnetic radiation, neutrons, and energetic charged particles. Finally, the present disclosure relates to a handheld dual thermal neutron detector and gamma-ray spectrometer using any Li chalcopyrite synthesized by the methods described herein, as well as doped strontium iodide, sodium iodide, a gamma scintillator, a gamma semiconductor (such as cadmium zinc telluride (CZT)), or the like.

BACKGROUND OF THE DISCLOSURE

The present state-of-the-art in semiconductor radiation detection is silicon diodes, high purity germanium (cooled by liquid nitrogen), and compound semiconductors, such as CZT and mercuric iodide. Each of these materials has one or more significant drawbacks related to its use. Silicon has a low atomic number and is therefore primarily useful for the detection of energetic charged particles and atomic x-rays emitted by low atomic number elements. Germanium has a higher atomic number but, because of its low band gap energy, must be cooled by liquid nitrogen in a bulky, expensive, and potentially dangerous cryogenic system in order to reduce thermally generated noise. Compound semiconductors, such as CZT and mercuric iodide, have sufficiently high band gap energy to be useful at or near room temperature. However, CZT has been plagued by production problems, resulting in polycrystalline ingots with twins, inclusions, and grain boundary defects. These defects can never be completely removed and are a consequence of CZT being a solid solution, rather than a true compound. The result is that spectroscopy grade crystals must be mined from bulk material. Mercuric iodide suffers from low carrier mobility, short carrier lifetime, space charge polarization, and surface degradation. In addition, mercuric iodide is an extremely soft material that is easily damaged by the slight pressure of an electrical connection and by temperatures over sixty degrees Celsius. In general, these compound semiconductors do not interact well with neutrons such that they must be coupled with a thin layer of a neutron absorbing material, such as $^6$LiF or $^{10}$B. A reaction between $^6$Li or $^{10}$B occurs in the thin absorber layer, which creates alpha particles that are detected by a semiconducting substrate. The absorber layer must be thin in order for the semiconducting substrate to detect the resultant alpha particles. $^3$He gas filled tube detectors are the state-of-the-art for thermal neutron detection.

As a result, U.S. Pat. No. 7,687,780 (Bell et al.) provides a semiconductor detector of ionizing electromagnetic radiation, neutrons, and energetic charged particles. The detecting element includes a compound having the composition I-III-VI$_2$ or II-IV-V$_2$, where the "I" component is from column 1A or 1B of the periodic table, the "II" component is from column 2B of the periodic table, the "III" component is from column 3A of the periodic table, the "IV" component is from column 4A of the periodic table, the "V" component is from column 5A of the periodic table, and the "VI" component is from column 6A of the periodic table. The detecting element detects ionizing electromagnetic radiation by generating a signal proportional to the energy deposited in the element, and detects neutrons by virtue of the ionizing electromagnetic radiation emitted by one or more of the constituent materials subsequent to capture. The detector may contain more than one neutron sensitive component.

Related to the I-III-VI$_2$ compounds, however, improved methods for combining the elemental constituents in a multistep synthetic process are still required, providing improved purity and homogeneity and more precisely controlling the reaction rate and yielding a I-III-VI$_2$ charge with a single phase stoichiometry.

Further, a worldwide helium shortage has developed in recent years due to the limited supply of $^3$He and an increasing demand for neutron detection materials for scientific and security applications. As a result, research into alternatives to gas detectors ($^3$He or $^{10}$BF$_3$) or scintillation detectors (cerium-doped lithium glass) has grown. The latter of these are generally called elpasolites and one, CLYC, has been shown to be a dual neutron/gamma detector. However, in practice, CLYC has serious manufacturing, cost, and stability problems. It is highly desirable to develop an improved solid-state detector for neutron detection. In much the same way as solid-state CZT detectors have revolutionized gamma-ray detection, a solid-state neutron detector would offer the significant advantages of portability, sensitivity, simplicity, and low cost. A neutron absorber (e.g., $^6$Li or $^{10}$B) must be used along with a charge collector in such a device. To date, most reports of lithium containing solid-state neutron detectors have used a lithium conversion layer in conjunction with a silicon diode detector. To obtain a useable thickness of lithium to stop neutrons efficiently, deep holes are etched into the silicon, and a lithium (or boron) containing material is conformally deposited into the holes. If, however, the neutron absorber is within the charge generating/collecting device, which is the semiconductor that each thermal neutron impinging on the detector crystal has a high probability of reacting with, the absorber atom inside the solid generates high-energy charged particles that, in turn, use their energy to create electron-hole pairs in the semiconductor. This is the same phenomenon that occurs in coated semiconductor detectors; however, in the Li containing compound semiconductor, the charged particles are created within the charge collection device, and the entire Q-value of the reaction is available for charge generation. In the coated detector, however, only one of the two charged particles can enter the detector, and that alpha particle must have lost a random fraction of its energy traversing the absorber layer. Ternary I-III-VI$_2$ semiconductors with a chalcopyrite crystal structure type would meet these criteria if $^6$Li is included, for example.

BRIEF SUMMARY OF THE DISCLOSURE

In various exemplary embodiments, the present disclosure provides a multistep synthetic process for synthesizing an inorganic compound with unique electrical and optical properties. This compound is semiconducting and can be developed for nonlinear optical applications, as well as radiation detection. The I-III-VI$_2$ stoichiometry crystallizes into a chalcopyrite type structure, and when the Group I element is lithium, the material is potentially ideal for the room temperature detection of neutrons, for example. The best known synthesis method, described in U.S. Pat. No. 7,687,780 (Bell et al.), involves heating stoichiometric quantities of the three elemental powders simultaneously to form the I-III-VI$_2$ compound. For the lithium containing compounds, lithium reactivity is difficult to control, leading to poor phase homogeneity. Thus, the present disclosure provides improved methods for combining the elemental constituents in a multistep synthetic process. These methods provide improved purity and homogeneity and more precisely control the reaction rate, thereby yielding a I-III-VI$_2$ charge with a single phase stoichiometry.

In one exemplary embodiment, the present disclosure provides a method for synthesizing I-III-VI$_2$ compounds, including: melting a Group III element; adding a Group I element to the melted Group III element at a rate that allows the Group I and Group III elements to react thereby providing a single phase I-III compound; and adding a Group VI element to the single phase I-III compound and heating. The Group III element is melted at a temperature of between about 200 degrees C. and about 700 degrees C. One (1) mole of the Group I element is added to 1 mole of the Group III element. The Group I element consists of a neutron absorber, preferably $^6$Li, and the Group III element consists of In or Ga. The Group VI element and the single phase I-III compound are heated to a temperature of between about 700 degrees C. and about 1000 degrees C. Two (2) moles of the Group VI element are added to the single phase I-III compound. Preferably, the Group VI element consists of S, Se, or Te. Optionally, the method also includes doping with a Group IV element activator.

In another exemplary embodiment, the present disclosure provides a method for synthesizing I-III-VI$_2$ compounds, including: melting a Group III element; adding a Group I element to the melted Group III element at a rate that allows the Group I and Group III elements to react thereby providing a single phase I-III compound; and adding a Group VI element to the single phase I-III compound under heat while rotating all constituents at an angle. The Group III element is melted at a temperature of between about 200 degrees C. and about 700 degrees C. One (1) mole of the Group I element is added to 1 mole of the Group III element. The Group I element consists of a neutron absorber, preferably $^6$Li, and the Group III element consists of In or Ga. The Group VI element and the single phase I-III compound are heated to a temperature of between about 700 degrees C. and about 1000 degrees C. Two (2) moles of the Group VI element are added to the single phase I-III compound. Preferably, the Group VI element consists of S, Se, or Te. Optionally, the method also includes doping with a Group IV element activator.

In a further exemplary embodiment, the present disclosure provides a method for synthesizing I-III-VI$_2$ compounds, including: melting a Group III element; adding a Group I element to the melted Group III element at a rate that allows the Group I and Group III elements to react thereby providing a single phase I-III compound; and adding a Group VI element to the single phase I-III compound under heat via vapor transport. The Group III element is melted at a temperature of between about 200 degrees C. and about 700 degrees C. One (1) mole of the Group I element is added to 1 mole of the Group III element. The Group I element consists of a neutron absorber, preferably $^6$Li, and the Group III element consists of In or Ga. The Group VI element and the single phase I-III compound are heated to a temperature of between about 700 degrees C. and about 1000 degrees C. Two (2) moles of the Group VI element are added to the single phase I-III compound. Preferably, the Group VI element consists of S, Se, or Te. Optionally, the method also includes doping with a Group IV element activator. In this exemplary embodiment, the single phase I-III compound and the Group VI element are physically separated in the reaction vessel. The reaction takes place through vapor transport of the Group VI element into the single phase I-III compound melt by maintaining the Group VI element region at a higher temperature than the single phase I-III compound melt region.

In various exemplary embodiments, the present disclosure also provides a room temperature compound semiconductor detector crystal containing a neutron absorbing element within the compound and a scintillation crystal sensitive to gamma rays backed directly by a semiconductor photodetector combined into a single handheld package. Using selective shielding of each of the two detectors, the package combines high gamma-to-neutron discrimination, low cost, low power, insensitivity to magnetic fields, and compact design. The case contains the detector crystals, bias voltage, amplification, and a multichannel analyzer for data collection, as well as lithium ion batteries for power. The lithium ion battery also provides a neutron shield for the gamma detection crystal. Tungsten shielding of gamma rays is placed in front of the neutron detection crystal. The detector package is coupled with a smartphone interface or the like for data processing and output. It is envisioned that a $^6$LiInSe$_2$ neutron detector crystal or the like and a high energy resolution SrI$_2$(Eu) gamma scintillator crystal or the like, coupled with a high bandgap photodetector that has a response that is spectrally matched to the emission of the scintillator, will be used to collect the emitted light. A Si Avalanche photodiode (APD) and a Si photomultiplier (SiPM) are two exemplary types of high bandgap photodetectors. As an example of acceptable spectral matching, the emission peak of the SrI$_2$(Eu) scintillation is at 435 nm and coincides with the maximum photon-detection efficiency (PDE) of commercial SiPMs. Other combinations of high bandgap photodetectors with matched response to the emission of the scintillator are also envisioned.

Thus, in a still further exemplary embodiment, the present disclosure provides a combined thermal neutron detector and gamma-ray spectrometer system, including: a first detection medium including a lithium chalcopyrite crystal operable for detecting neutrons; a gamma ray shielding material disposed adjacent to the first detection medium; a second detection medium including one of a doped metal halide, an elpasolite, and a high Z semiconductor scintillator crystal operable for detecting gamma rays; a neutron shielding material disposed adjacent to the second detection medium; and a photodetector coupled to the second detection medium also operable for detecting the gamma rays; wherein the first detection medium and the second detection medium do not overlap in an orthogonal plane to a radiation flux. Optionally, the first detection medium includes a $^6$LiInSe$_2$ crystal. Optionally, the second detection medium includes a SrI$_2$(Eu) scintillation crystal. The photodetector includes preferentially a high bandgap photodetector, such as a silicon avalanche photodiode or a silicon photomultiplier. Optionally, the gamma ray shielding material includes tungsten. Optionally, the neutron shielding material includes lithium. The system also includes a microprocessor. The system further includes a data collection and processing device. Optionally, the first detection medium includes a I-III-VI$_2$ compound formed by the process of: melting a Group III element; adding a Group I element to the melted Group III element at a rate that allows the Group I and Group III elements to react thereby providing a single phase I-III compound; and adding a Group VI element to the single phase I-III compound and heating; wherein the Group I element comprises lithium.

Finally, in a still further exemplary embodiment, the present disclosure provides a method for providing a combined thermal neutron detector and gamma-ray spectrometer system, including: providing a first detection medium including a lithium chalcopyrite crystal operable for detecting neutrons; disposing a gamma ray shielding material adjacent to the first detection medium; providing a second detection medium including one of a doped metal halide, an elpasolite, and a high Z semiconductor scintillator crystal operable for detecting gamma rays; disposing a neutron shielding material adjacent to the second detection medium; and providing a photodetector coupled to the second detection medium also operable for detecting the gamma rays; wherein the first detection medium and the second detection medium do not overlap in an orthogonal plane to a radiation flux. Optionally, the first detection medium includes a $^6$LiInSe$_2$ crystal. Optionally, the second detection medium comprises a SrI$_2$(Eu) scintillation crystal. The photodetector includes preferentially a high bandgap photodetector, such as a silicon avalanche photodiode or a silicon photomultiplier. Optionally, the gamma ray shielding material includes tungsten. Optionally, the neutron shielding material includes lithium. The system also includes a microprocessor. The system further includes a data collection and processing device. Optionally, the first detection medium includes a I-III-VI$_2$ compound formed by the process of: melting a Group III element; adding a Group I element to the melted Group III element at a rate that allows the Group I and Group III elements to react thereby providing a single phase I-III compound; and adding a Group VI element to the single phase I-III compound and heating; wherein the Group I element includes lithium.

BRIEF DESCRIPTION OF THE DRAWINGS

The present disclosure is illustrated and described herein with reference to the various drawings, in which like reference numbers are used to denote like method steps/system components, as appropriate, and in which.

DETAILED DESCRIPTION OF THE DISCLOSURE

Again, related to U.S. Pat. No. 7,687,780 (Bell et al.), the detecting element includes a compound having the composition I-III-VI$_2$ or II-IV-V$_2$, where the "I" component is from column 1A or 1B of the periodic table, the "II" component is from column 2B of the periodic table, the "III" component is from column 3A of the periodic table, the "IV" component is from column 4A of the periodic table, the "V" component is from column 5A of the periodic table, and the "VI" component is from column 6A of the periodic table. A more concise manner of description is that the crystal is formed from elements in the group of 1A-3A-6A, 1B-3A-6A, or 2B-4A-5A of the periodic table. An example from group 1A-3A-6A is lithium-gallium-selenium. An example from group 1B-3A-6A is copper-gallium-selenium. An example from group 2B-4A-5A is cadmium-germanium-antimony. Crystals formed from groups 1B-3A-6A and 2B-4A-5A are chalcopyrites. The detecting element detects ionizing electromagnetic radiation by generating a signal proportional to the energy deposited in the element, and detects neutrons by virtue of the ionizing electromagnetic radiation emitted by one or more constituent materials subsequent to capture. The detector may contain more than one neutron sensitive element.

The detecting system generally includes a semiconductor crystal onto which conducting electrodes are deposited on opposing surfaces of the crystal. The semiconductor material may be intrinsic material or doped to produce intrinsic material. Intrinsic material, when referring to semiconductors, refers to a semiconductor material in which the majority and minority charge carriers in the material are balanced and the material does not display either negative (n-) or positive (p-) type conductivity. Doping is the process of introducing small amounts of impurities (typically in the amount of parts per million (ppm)) for the purpose of altering the electrical properties of the material to force a desired density of positive and negative charge carriers. The electrical contacts may be ohmic, or may be Schottky. An ohmic contact is a metal semiconductor contact with very low resistance independent of the polarity of the applied voltage. A Schottky contact is a metal semiconductor contact used to form a potential barrier. The resulting detecting element forms a p-n, or p-i-n diode, or simply a bulk semiconducting material.

In a preferred embodiment, a voltage is applied between the electrodes by a suitable means, such as a battery. A resistor is provided in line between one of the electrodes and the battery. Any signal generated in response to radiation is extracted through a junction between the crystal and the resistor. If the detecting element is simply bulk semiconducting material, then the polarity of the voltage with respect to the resistor is of no consequence. Although the resistor connected between the negative terminal of the battery and the crystal is contemplated, the resistor may also be connected between the positive terminal of the battery and the crystal with the signal taken from the junction between the resistor and the crystal. If the crystal is realized as a diode (p-n, p-i-n, or Schottky), then the connection must be such that the diode is reverse biased by the battery.

When the crystal is exposed to ionizing electromagnetic radiation, electron-hole pairs are created in the bulk of the material. These charges are separated by the applied voltage and the resulting charge pulse is sensed as a current pulse or a voltage pulse. The amplitude of the charge pulse is proportional to the energy deposited in the crystal by the radiation. In this mode, the crystal realizes a detector of alpha, beta, gamma, and x-ray radiation, in addition to cosmic rays.

In one arrangement, the crystal may be fabricated with one element that reacts with neutrons and subsequently emits ionizing electromagnetic radiation. The crystal then also serves to detect neutrons. For example, if the "I" element is silver (Ag), an element from column 1B of the periodic table, then exposure to neutrons results in transmutation of the silver nuclei to radioisotopes with short half-lives. These isotopes decay by the emission of beta particles (electrons), which create ionization in the detector just as would radiation originating outside the detecting element. Analysis of the spectrum of pulse amplitudes and the temporal behavior of the count rate yields a signature of the presence of neutrons.

In another arrangement, if the "I" element is lithium, an element from column 1A of the periodic table, then exposure to neutrons results in the exothermic reaction $^6Li(n,\alpha)^3H$. The energetic triton and alpha particles liberate charge as they decelerate, ultimately depositing their entire energy in the crystal. Analysis of the resulting spectrum of pulse amplitudes yields a signature of the presence of neutrons.

In a further arrangement, if the "III" (3A) element of the crystal is indium (In), behavior similar to that described for silver is observed. In a still further arrangement, more than one element may be neutron sensitive. For example, if both silver and indium are used, then multiple half-lives are observed in the count rate, and spectra of beta particles characteristic of both elements are observed in the pulse height spectrum. Analysis of such data can give information on the spectral characteristics of the incident neutron flux.

In operation, the semiconductor radiation detecting apparatus works in the following manner. Means are provided to convert current or charge pulses to a digital value. The electrical charge signal generated in response to radiation passes from the junction through a capacitor to a charge integrating pre-amplifier whose output signal, in turn, is directed to a shaping amplifier. The shaping amplifier produces an approximately Gaussian shaped pulse. The pulse is directed to an analog-to-digital converter (ADC), which translates the analog voltage developed by the shaping amplifier into a digital value. The digital values from the converter are directed to a processor and display. The processor records the number of times each value occurs during a measurement. This accumulates a histogram of the magnitudes of the pulses produced by the incident radiation. The processor compares these values to known values and provides an indication of the incident radiation based on the comparison. The use of the amplifiers, converter, and processor to condition signals and create an indication of the incident radiation is well known to those of ordinary skill in the art and does not require detailed explanation.

In an alternate embodiment, the pre-amplifier simply provides gain without integration and the shaping amplifier is replaced by a voltage comparator and gated integrator. The voltage comparator triggers the gated integrator to integrate the voltage pulse from the pre-amplifier. The gated integrator signals the ADC to perform a conversion when the integration period is complete. The processor and display perform the same functions as described above.

In another alternate embodiment, a battery supplies bias to the crystal. The charge generated by incident radiation in the crystal is separated by the potential developed by the virtual ground at the inverting terminal of the operational amplifier, and the resulting current pulse is forced through a feedback resistor. In this manner, the current pulse is converted to a voltage pulse and is then directed to the pre-amplifier.

These crystals are useful as radiation detectors, and as semiconductors, for the following reasons. Carrier mobility in the range of 500-10,000 cm$^2$/V-s has been reported and band gaps between 1.2 and 2.7 eV have been produced. These values are comparable to or better than those of germanium and indicate that performance at room temperature should exceed that of CZT. In addition, some of the constituent materials have high neutron absorption cross sections, conferring simultaneous sensitivity to ionizing electromagnetic radiation and neutrons.

There are a number of advantages to using chalcopyrites. There is a ready availability of high purity, oriented, crack free, single chalcopyrite crystals produced for use in optical applications. These crystals are used in infrared nonlinear optical equipment to effect second harmonic generation or optical parametric oscillation. The finished materials have improved properties that should continue to improve as a result of research and development spurred by the interest of the military in using chalcopyrites in high powered lasers. Chalcopyrites have physical properties that permit their use as semiconductor radiation detectors at room temperature. As such, they operate according to the same physics as do silicon, CZT, and mercuric iodide. However, they differ from these materials in that the average atomic number is much larger than silicon, making them useful at higher energies than silicon. They can be grown in large, crack free single crystal boules (unlike CZT and mercuric iodide). Further, the neutron absorber density is large and average Z number is low compared to CZT, for example, such that high neutron detection efficiencies can be realized using thin crystals, thereby minimizing gamma interference in the chalcopyrite crystals. They also are an improvement over mercuric iodide in that the use of mercuric iodide is limited to applications in which the temperature does not exceed 80 degrees Celsius, while chalcopyrites can withstand temperatures up to several hundred degrees Celsius.

Without limitation, it may be advantageous to deposit more than two electrodes onto the crystal to control the shape of the internal electric field. In another example, sandwiching the crystal between spring loaded contacts enables the application of a voltage without the deposition of electrodes. In yet another example, the pre-amplifier, shaping amplifier, and ADC may be replaced by a charge-to-digital converter.

Figure 1:
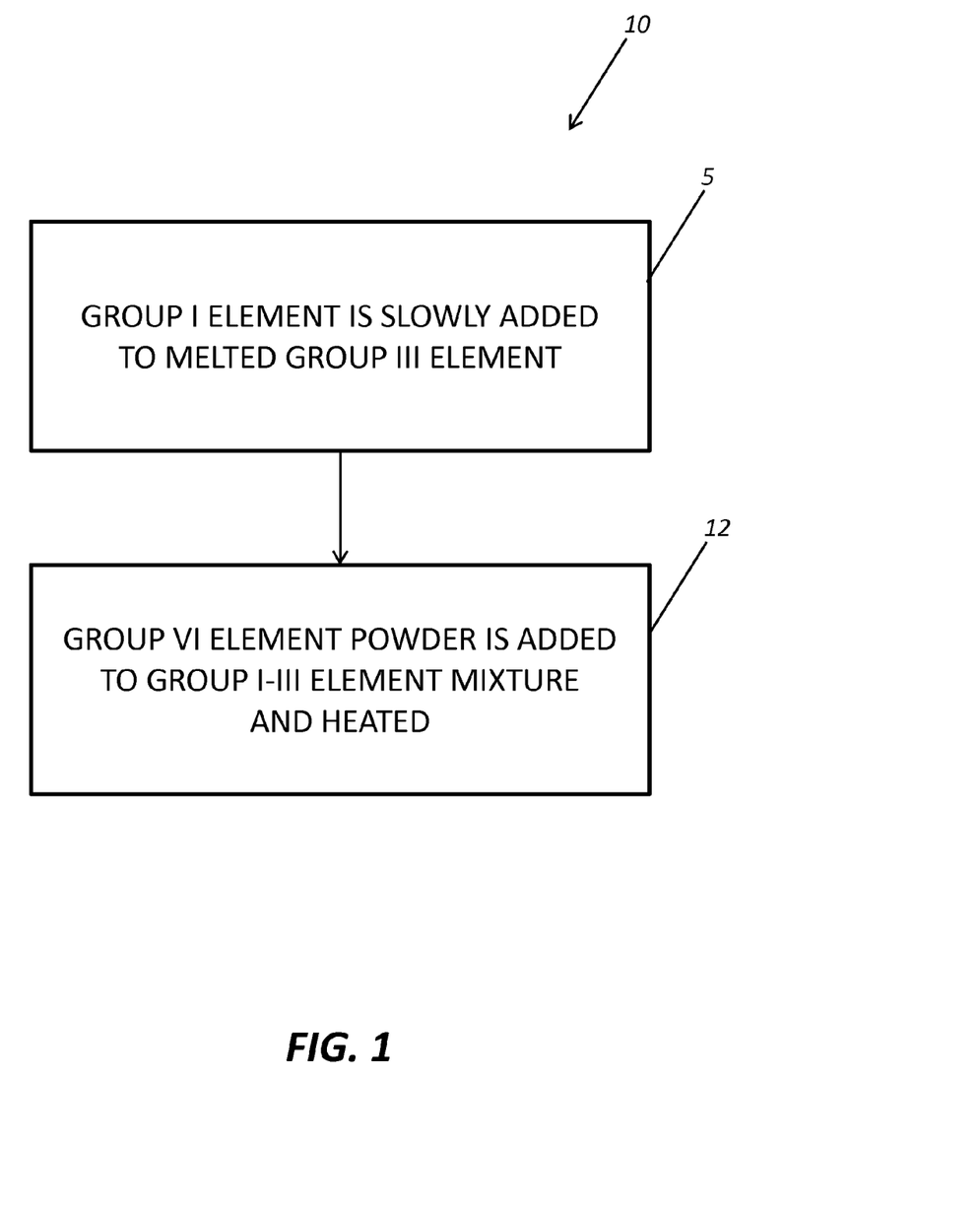
FIG. 1 is a flowchart illustrating one exemplary embodiment of the method for synthesizing I-III-VI$_2$ compounds of the present disclosure, specifically utilizing a heating process.
Figure 2:
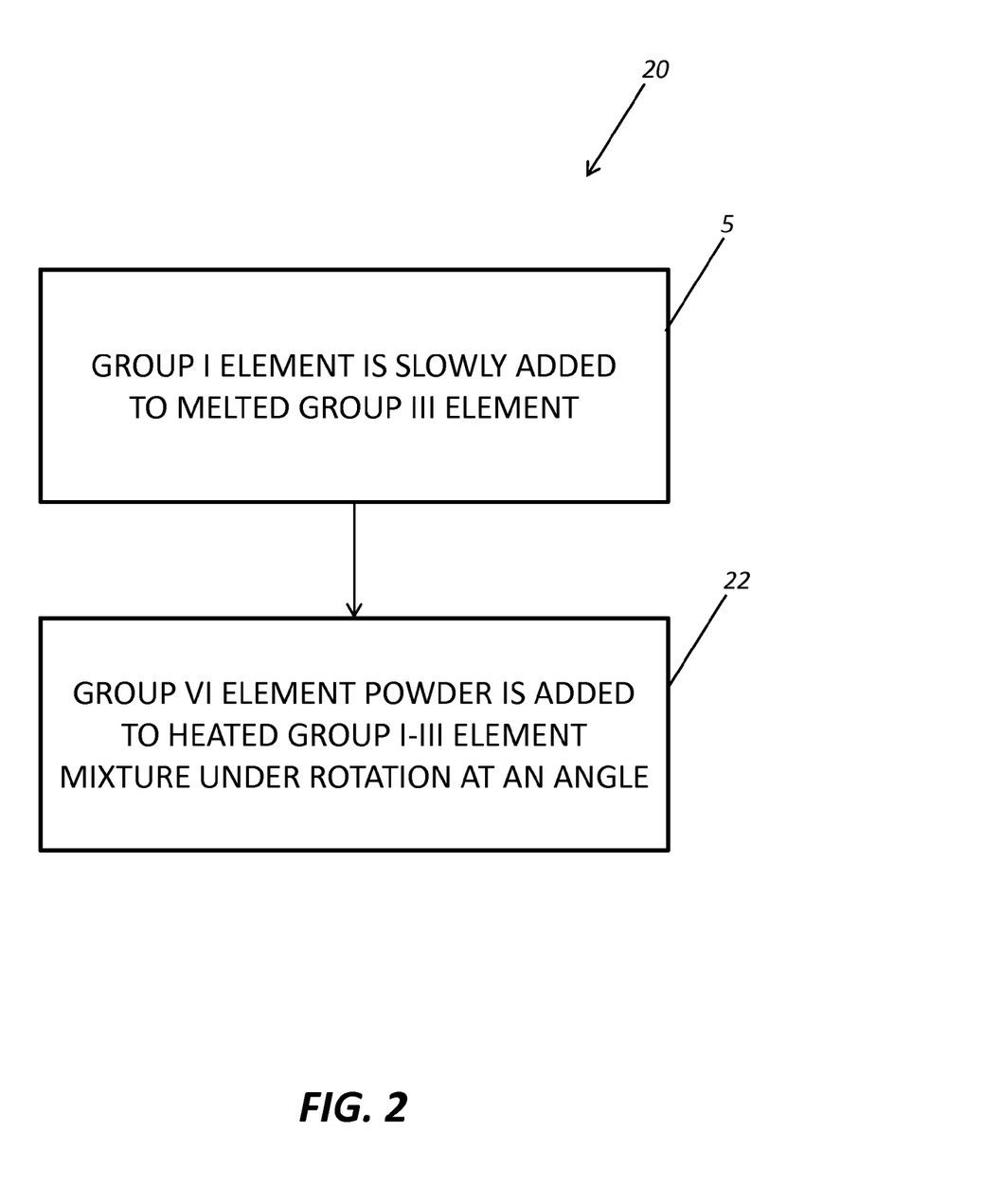
FIG. 2 is a flowchart illustrating another exemplary embodiment of the method for synthesizing I-III-VI$_2$ compounds of the present disclosure, specifically utilizing a mixing process.
Figure 3:
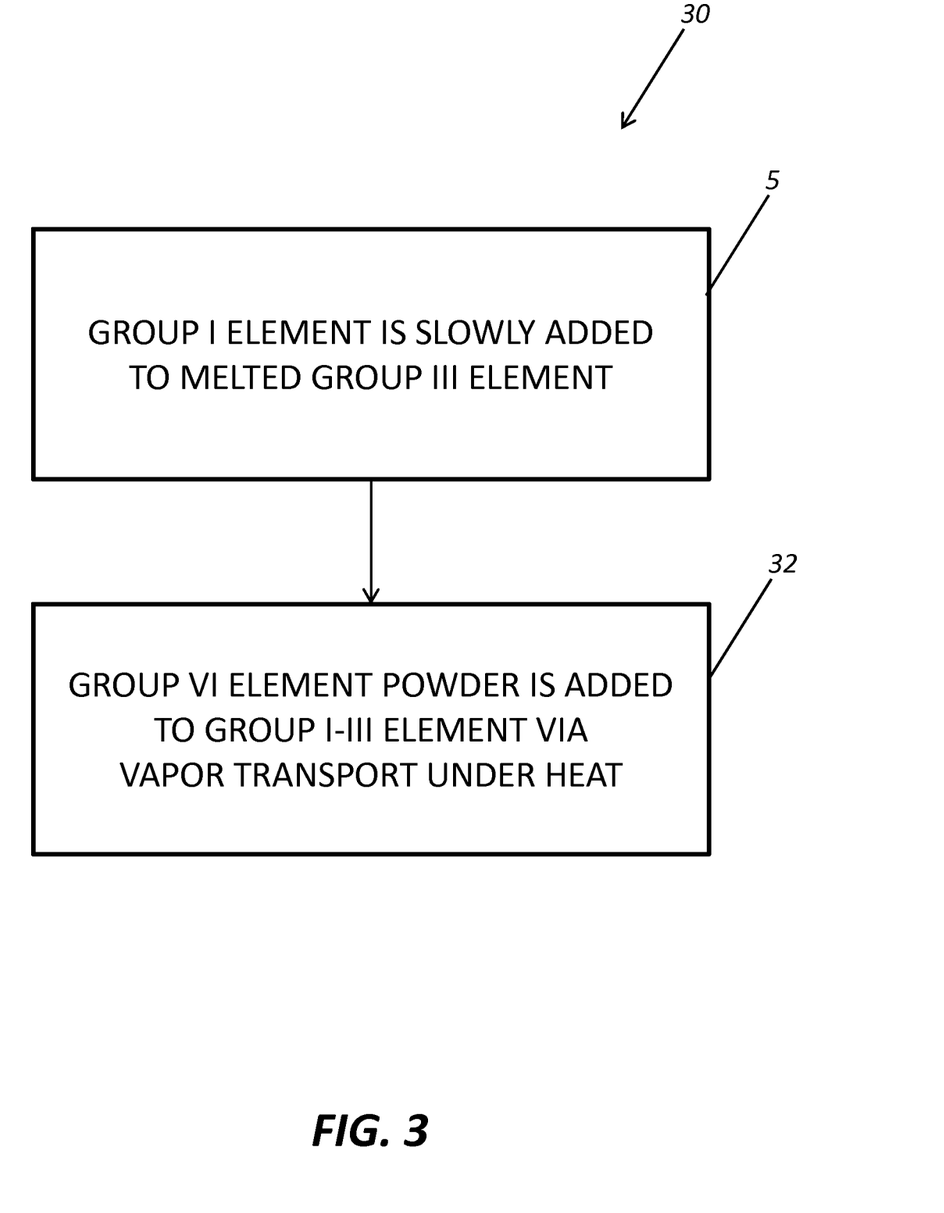
FIG. 3 is a flowchart illustrating a further exemplary embodiment of the method for synthesizing I-III-VI$_2$ compounds of the present disclosure, specifically utilizing a vapor transport process.

In view of the above, the present disclosure involves separating I-III-VI$_2$ synthesis from the constituent elements into two distinct steps, and three associated embodiments are contemplated. The highest quality elemental starting materials are required to achieve successful synthesis of I-III-VI$_2$ compounds. Group I elements typically have the lowest purities as starting materials. Referring to FIGS. 1-3, in all exemplary embodiments, the most reactive element (Group I) is reacted with the Group III element, forming a binary alloy with equal stoichiometry 5. The Group III element is melted in a crucible under inert atmosphere for increased safety and purity. The Group I element is then slowly added to the melt, allowing the small amount of Group I element to react before another addition. This process minimizes overheating of the reaction, which causes additional alloy stoichiometries to form in the melt. The result is a highly crystalline, single phase I-III material. Two moles of a Group VI element are then added to the I-III compound at elevated temperature to form the chalcopyrite I-III-VI$_2$. The method by which the Group VI element is added is different in each of the three exemplary embodiments.

Referring specifically to FIG. 1, in the first exemplary embodiment 10, the Group VI elemental powder is added directly to the I-III alloy and heated to 700-900 degrees C. (depending on the group VI element) in a crucible 12. The reaction is allowed to proceed to completion and then cooled. Because the I-III compound is formed in an initial reaction step, the stoichiometry is defined as one mole for each element. Addition of the Group VI element for the final I-III-VI reaction has lower overall stoichiometric variability throughout the charge.

Referring specifically to FIG. 2, in the second exemplary embodiment 20, the addition of the Group VI element into a single crucible is as with the first exemplary embodiment; however, the constituents are mixed at elevated temperature with constant crucible rotation at an angle 22, for example about 20 degrees. Rotation further promotes mixing during the synthesis to reduce phase variability.

Referring specifically to FIG. 3, the third exemplary embodiment 30 involves vapor transport of the Group VI element 32. The previously prepared I-III compound is placed in one well of a crucible, while the Group VI element is placed in an adjacent well. As the mixture is heated to 700-900 degrees C., the Group VI element slowly vaporizes and is transported through thermal currents to the melted group I-III well. The reaction then occurs to form I-III-VI$_2$. Vapor transport further slows the reaction to minimize overheating and promote a single phase synthetic charge.

It should be noted that the methods of the present invention are not limited to the synthesis of semiconductor materials. Doping with an activator (e.g., Group IV element) may be performed to create a scintillator material, for example.

Figure 4:
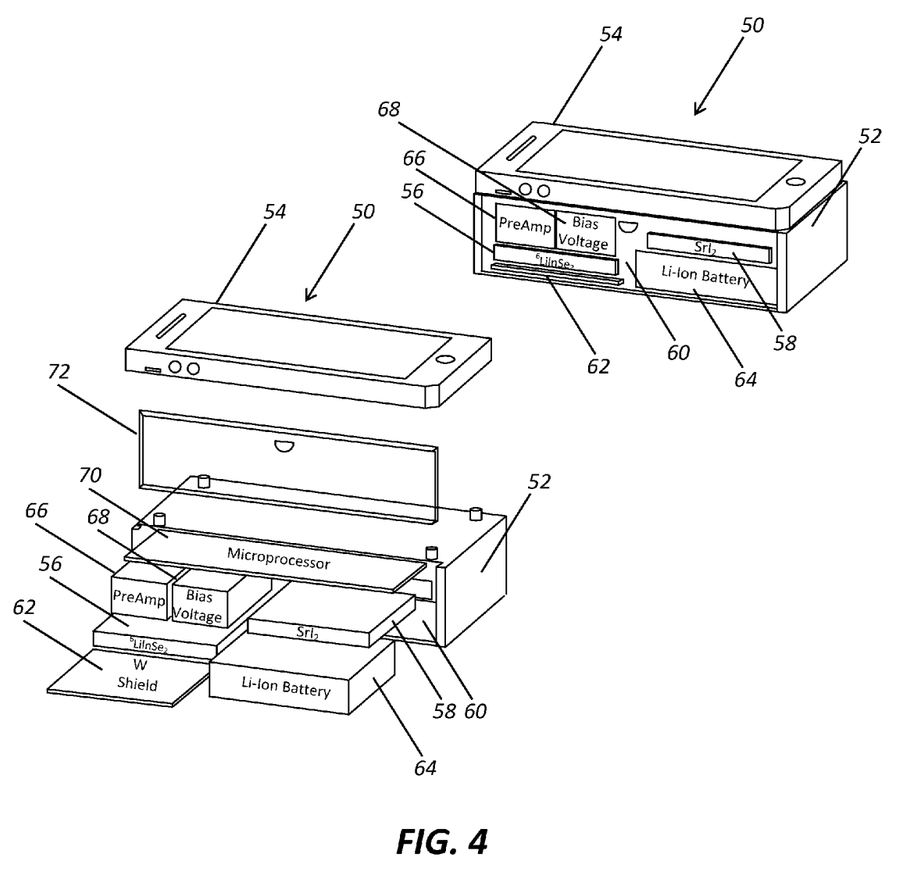
FIG. 4 is a schematic diagram and an exploded schematic diagram illustrating one exemplary embodiment of the handheld dual thermal neutron detector and gamma-ray spectrometer of the present disclosure.

Referring now specifically to FIG. 4, in one exemplary embodiment of the handheld dual thermal neutron detector and gamma-ray spectrometer 50 of the present disclosure, all of the detection media, microelectronics, power, and shielding are combined in a small package 52 which can be coupled to a mobile processing and display device 54. The active detection media are a $^6$LiInSe$_2$ crystal 56 or the like and a SrI$_2$(Eu) scintillation crystal 58 or the like coupled to a spectrally matched light collection diode 60. $^6$LiInSe$_2$ is a single crystal semiconductor in which thermal neutrons (0.025 eV) react with $^6$Li to generate charged particles that are detected directly within the crystal 56. This is the advantage of having the neutron absorber within the bulk of the semiconductor. Gamma rays are detected via the SrI$_2$(Eu) scintillation crystal 58. Light emitted due to gamma absorption can be collected with a Si avalanche photodiode (APD), a Si photomultiplier (SiPM), or some other high bandgap photodetector 60. The detector is assembled in a fashion where the crystals 56 and 58 do not overlap in the orthogonal plane to the radiation flux. A tungsten shield 62 or the like is placed in front of the $^6$LiInSe$_2$ crystal 56 to block gamma rays that are typically present in a radiation flux. The tungsten shield 62 is nominally transparent to thermal neutrons. Similarly, a neutron shield 64 is placed in front of the SrI$_2$(Eu) crystal 58. In this case, the Li-ion battery 64 used to power the device also acts as a neutron shield. Typical microelectronics (including a pre-amp 66, bias voltage 68, and microprocessor 70) are used to apply an electrical bias to the $^6$LiInSe$_2$ crystal 56 and provide data collection and processing. A transparent door 72 or the like may also be used as a portion of the housing.

While many systems purport the combination of a neutron detector and gamma ray detector within a variety of small architectures, this is the first embodiment which combines the advantages of a compound semiconductor neutron detector (i.e., the neutron absorbing media being contained regularly within the stoichiometry of a molecular solid crystal) and a gamma-ray scintillation crystal backed directly by a matched solid state photodetector. Others have embodied a gas detector, combined a neutron scintillation crystal with a semiconductor for charge collection, or applied a neutron absorbing materials to the surface of a semiconductor crystal, or used one detector sensitive to both neutrons and gammas and a pulse shape discrimination technique. These others all have the disadvantages of either cost, power, size, or particle discrimination. Similarly, gamma ray detectors have been embodied which are semiconductor crystals, or scintillator crystals that collect charge with a photomultiplier tube or a semiconductor photodetector.

The primary application of such a solid-state combined thermal neutron/gamma detector in the present disclosure is passive, non-contact detection of nuclear materials. All fissile material can be detected by neutron emission—either spontaneous or stimulated. Unlike low-energy gamma rays, neutrons are relatively difficult to shield, requiring appreciable volumes and thicknesses of low-Z materials (hydrogen containing, scattering) or neutron-absorbing (lithium or boron) materials. Weapons grade plutonium emits sufficient neutrons as a result of spontaneous fission to be directly (i.e., passively) detected at distances of several meters. Enriched uranium ($^{235}$U) can be detected by interrogating the material with a low energy neutron source to induce fission within the material (i.e., active detection). Active detection also is possible with both prompt ("source on") neutrons and delayed ("source off") neutrons. In addition to $^{235}$U, both $^{238}$U and $^{232}$Th may be detected using a more energetic (i.e., several MeV) neutron source to induce fissions and their time-correlated neutrons. Finally, non-fissile nuclear materials—such as lithium deuteride or possibly beryllium—may be detectable by active detection using neutrons because these materials attenuate the incident neutron beam. The feasibility of the detection of nuclear warheads using neutrons has been analyzed by U.S. and Russian researchers.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:
1. A combined thermal neutron detector and gamma-ray spectrometer system, comprising:
    a first solid state detection medium comprising a lithium chalcopyrite single crystal material operable for detecting neutrons;
    a gamma ray shielding material disposed adjacent to the first detection medium;

a second solid state detection medium comprising one of a doped metal halide, an elpasolite, and a high Z semiconductor scintillator crystal operable for detecting gamma rays;

a neutron shielding material disposed adjacent to the second detection medium;

a photodetector coupled to the second detection medium also operable for detecting the gamma rays;

wherein the first detection medium and the second detection medium and the associated shielding materials are disposed in a side-by-side configuration and do not overlap in an orthogonal plane to a radiation flux emanating from the radiation source; and a mobile device disposed adjacent and coupled to the first detection medium and the second detection medium.

2. The system of claim 1, wherein the first detection medium comprises a $^6$LiInSe$_2$ single crystal material.

3. The system of claim 1, wherein the second detection medium comprises a SrI$_2$(Eu) scintillation crystal.

4. The system of claim 1, wherein the photodetector comprises one of a silicon avalanche photodiode and a silicon photomultiplier.

5. The system of claim 1, wherein the gamma ray shielding material comprises tungsten.

6. The system of claim 1, wherein the neutron shielding material comprises lithium.

7. The system of claim 1, further comprising a microprocessor.

8. The system of claim 1, further comprising a data collection and processing device.

9. The system of claim 1, wherein the first detection medium comprises a I-III-VI$_2$ compound formed by the process of:

melting a Group III element;

adding a Group I element to the melted Group III element at a rate that allows the Group I and Group III elements to react thereby providing a single phase I-III compound; and adding a Group VI element to the single phase I-III compound and heating;

wherein the Group I element comprises lithium.

10. A method for providing a combined thermal neutron detector and gamma-ray spectrometer system, comprising:

providing a first solid state detection medium comprising a lithium chalcopyrite single crystal material operable for detecting neutrons;

disposing a gamma ray shielding material adjacent to the first detection medium;

providing a second solid state detection medium comprising one of a doped metal halide, an elpasolite, and a high Z semiconductor scintillator crystal operable for detecting gamma rays;

disposing a neutron shielding material adjacent to the second detection medium;

providing a photodetector coupled to the second detection medium also operable for detecting the gamma rays;

wherein the first detection medium and the second detection medium and the associated shielding materials are disposed in a side-by-side configuration and do not overlap in an orthogonal plane to a radiation flux emanating from the radiation source; and providing a mobile device disposed adjacent and coupled to the first detection medium and the second detection medium.

11. The method of claim 10, wherein the first detection medium comprises a $^6$LiInSe$_2$ single crystal material.

12. The method of claim 10, wherein the second detection medium comprises a SrI$_2$(Eu) scintillation crystal.

13. The method of claim 10, wherein the photodetector comprises one of a silicon avalanche photodiode and a silicon photomultiplier.

14. The method of claim 10, wherein the gamma ray shielding material comprises tungsten.

15. The method of claim 10, wherein the neutron shielding material comprises lithium.

16. The method of claim 10, further comprising providing a microprocessor.

17. The method of claim 10, further comprising providing a data collection and processing device.

18. The method of claim 10, wherein the first detection medium comprises a I-III-VI$_2$ compound formed by the process of:

melting a Group III element;

adding a Group I element to the melted Group III element at a rate that allows the Group I and Group III elements to react thereby providing a single phase I-III compound; and adding a Group VI element to the single phase I-III compound and heating;

wherein the Group I element comprises lithium.

* * * * *